Patented May 15, 1945

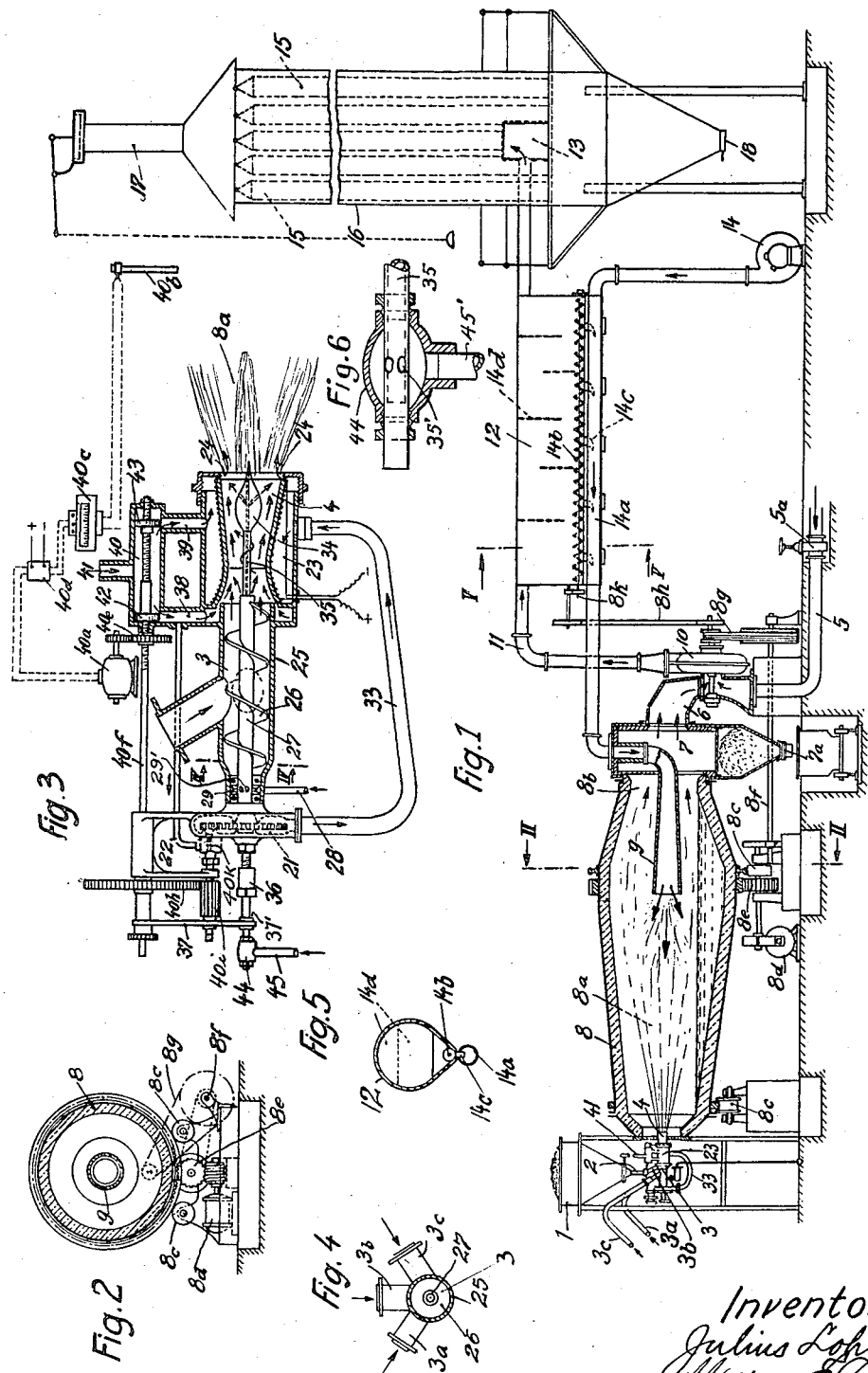

2,375,932

UNITED STATES PATENT OFFICE 2,375,932

CONTINUOUS METALLURGICAL TREATMENT OF RAW MATERIALS

Julius Lohse, Berlin-Wilmersdorf, Germany; vested in the Alien Property Custodian Original application October 15, 1940, Serial No. 316,314, now Patent No. 2,315,123, dated March 30, 1943. Divided and this application July 12, 1941, Serial No. 402,253. In Germany September 1, 1937

11 Claims. (Cl. 266—20)

My present application constitutes a division of my co-pending application Serial No. 361,314 filed October 15, 1940, now Patent No. 2,315,123, March 30, 1943, which is a continuation-in-part of my former application Serial No. 227,488 filed August 30, 1938. The invention of my present application relates to a continuous metallurgical treatment of raw materials in a flame chamber, more particularly for the desulphurization, chlorination, roasting or drying of ores, concentrates or other minerals, and has for its object to provide improvements by which there is rendered possible a uniform dressing of the material in one operation, for example in the case of roasting treatment even up to the extent of dead roasting, at the same time all manual operations together with any parts conducted through the material during the roasting operation and consequently subjected to considerable wear being avoided. Other advantages reside in the completely automatically regulable nature of the dressing treatment, which owing to a special returning means provided in accordance with the invention necessitates merely a short body or flame chamber and thus assists considerably to reduce the cost of the plant.

My present invention is based on the idea of employing as a carrier for the entire roasting operation the flame in conjunction with the ore dust which hitherto was considered during desulphurization and roasting as a great evil, but which according to my invention is introduced in such a way into the flame and preferably into the whirling flame that the large surfaces of the dust particles are continuously acted upon by the roasting agent. The problem with which the invention is primarily concerned consists in maintaining the dust and other ore particles during the roasting operation in intimate contact with the roasting agent and the solution to the problem resides in injecting the mixture for roasting into a hot chamber, preferably by charging them on to a whirling flame, whilst maintaining the current of roasting gas under pressure and performing the complete roasting operation in this hot current.

According to my invention, the ore, in a finely divided condition, is injected in common with the roasting agent under pressure into a hot chamber, floating in the current of roasting gas, and is again sucked off from this chamber whilst the current is maintained.

The fundamental idea of my invention resides not only in carrying out the roasting operation within an oxydizing flame zone, but also, owing to the large surface of the particles of dust and the favorable liberation of the affinitive forces of the roasting gases in relation to the material to be roasted, in making the roasting more spontaneous than has ever been possible heretofore in a flame chamber.

Additional to the above my invention also makes provision for the fact that, if necessary, the gases sucked off from the furnace and bearing the particles of ore floating therein are again mixed with fresh air and introduced into the furnace anew. The return of the sucked up gases takes place in opposition to and in such a manner and under such pressure as to distend the primary flame to a hollow cone.

Owing to the distension of the roasting flame in a flame chamber and by reason of fresh air added, the hot particles of ore give off within the flame in addition to their own heat, that of the sulphur or other additions included therein and thus exert an extremely favorable influence on the thermal economy of the complete treatment.

Owing to my invention of performing roasting in the hot current of a roasting flame and also by reason of the possibility of repeating the roasting operation one or more times in this current, it is possible to roast down the sulphur to small percentages, even to the extent of dead roasting, which result has not been attained with the apparatus previously in use.

According to my invention it is also proposed, after completion of the roasting operation, to conduct the current of gas with the particles of dust to a filtering device, whilst the large pieces precipitated in the furnace as a result of agglomerating are conducted by the rotary movement of the furnace into a collection hopper.

In addition to the stated advantages consisting in an increased roasting effect and the possibility of performing roasting even up to the extent of dead roasting the revolving furnace according to my invention is subject to much less wear than the apparatus previously in use, as a flame impinges on the brickwork of the furnace not radially, but at a tangent and also in whirling form, and a variation in temperature caused by the rotary movement with respect to those parts of the furnace, situated at one time above the charge in the flame chamber and at another time in cooling fashion beneath the charge, does not take place. There is also the advantage that the furnace can be bricked with simple radial bricks, the production of which is simpler and cheaper than that of shaped bricks. The total cost of a plant of the nature is accordingly very much less.

An additional advantage can be obtained according to my invention by providing the furnace with a regulable burner, which can be adjusted completely automatically by the use of known regulating means. By the use of a completely automatic device of this nature the roasting operation can be carried out independently to the skill of the man in charge, so that a certain roasting process having a certain roasting action can be adjusted once and for all solely on the basis of tests carried out in the laboratory.

My invention is illustrated by way of example in the accompanying drawing, in which Fig. 1 shows diagrammatically in elevation and in partial section a plant in which roasting is performed in an open flame current.

Fig. 2 is a sectional view on the line II—II in Fig. 1.

Fig. 3 is a partly sectional view on a larger scale of the burner shown in Fig. 1 diagrammatically.

Fig. 4 is a section on the line IV—IV in Fig. 3 showing more clearly the distribution of the intake pipes of the burner.

Fig. 5 is a sectional view along the line V—V in Fig. 1.

Fig. 6 is an enlarged detail showing the feeding mechanism.

In Fig. 1 the material is introduced together with the requisite coal into the hopper 1 in a disintegrated condition approximately equivalent to a screen mesh of 20–40. The ground material is discharged through the pipe 2 to a screw conveyor 26 in the burner 3. In the burner nozzle 4 there is an intimate mixing of the materials employed, for example oil, gas, coal and sulphide ores with secondary and primary air, with simultaneous agitation, so that after ignition of the flame the latter whirls in the form of a long conical flame 8a in the bricked conical jacket 8 of the furnace.

The burner structure comprises an air chamber 23 which encloses the nozzle structure 4 and opens at its forward end into the furnace 8, around the nozzle 4 at 24. Extending through the rear end of the air chamber and into the rear of the nozzle 4 is a screw conveyor tube 25 in which is a screw conveyor 26 supported upon a tubular shaft 27. Into the screw conveyor there opens the three inlets 3b, 3a and 3c, the inlet 3b receiving the pulverized ores, while roasting gas and coal dust are fed into the conveyor tube 25 by way of the inlets 3a and 3c respectively.

Fuel oil under pressure is fed through the pipe 28 to a suitable feed ring 29 surrounding the rear end of the tubular screw conveyor shaft 27 from which ring the fuel passes into the tubular shaft by way of apertures 29'. This fuel is discharged at the forward end of the shaft in the burner nozzle 4 where it mixes with the gas, powdered coal and minerals to be blown into the furnace.

The rear end of the screw shaft is connected with a rotor 21 which is driven by compressed air supplied through the pipe line 22 through a suitable nozzle against blades forming a part of the rotor 21, and by this means the screw is turned to feed the several materials to the burner. The air employed for driving the rotor 21 passes out of the rotor casing into the pipe line 33 and is discharged in the air chamber 23, as shown.

In the forward end of the burner nozzle 4 there is disposed the needle 34 which is axially adjustable within the nozzle to regulate or vary the size of the same. This needle 34 is carried upon the forward end of a tubular stem 35 which extends through the tubular shaft 27 and through the rotor 21 and is freely rotatable in the shaft and rotor as well as being axially movable therein. The tubular stem 35 passes through and is threadably coupled with a fixed supporting nut 36 which is located upon the side of the rotor 21 remote from the nozzle and the stem carries a pulley 37' about which is engaged a driving belt 37 which, in the manner hereinafter described transmits rotary motion to the stem and also moves axially of and with the stem when the latter is advanced or retracted for changing the position of the needle in the nozzle 4.

The numerals 38 and 39 designate air feed channels which lead from a compressed air chest 40 respectively, to the rear end of the burner nozzle 4 and the air chamber 23. The numeral 41 designates the air inlet for the air chest. The aforementioned air pipe 22 is branched off the channel 38. Within the air chest 40 are valves 42 and 43, which are under the control of suitable automatic regulating mechanism for governing the flow of air through the feed channels 38 and 39.

The valves 42 and 43 are secured to a shaft 40f which is in screw threaded connection with a wall of the air chest 40 through which it passes.

The regulating mechanism for the valves comprises a pair of gear wheels 40e one of which is mounted upon the shaft 40f to impart rotary motion thereto and also to have the shaft move axially therethrough whereby upon the turning of the gears the shaft 40f will be rotated and will also be axially shifted to move the valves 42 and 43 relative to the feed channels 38 and 39. The other one of the gears is operatively coupled with a motor 40a and this is under direct control of an electric pyrometer 40b. This pyrometer is electrically coupled with an indicator such as a galvanometer 40c and this in turn is coupled with an energy amplifying means 40d which is actuated by energy from the thermocouple or pyrometer 40b and actuates suitable electrical control apparatus which regulates the supplying of electric current from a source of supply to the motor 40a. No detailed illustration of the electric pyrometer, the galvanometer or the energy amplifying means and electric current controlling apparatus is believed to be necessary since the construction of such devices is well known to those versed in the electrical art as such devices are in daily use. With this control apparatus, as the electric current induced by the electric pyrometer varies, the variation will be indicated as degrees of heat upon the galvanometer 43 and these currents will effect the amplifying means of the mechanism in unit 40d to increase or decrease the current supplied to the motor 40a. As the motor 40a is actuated the gear of the pair of gears 40e, which is mounted upon the shaft 40f, will rotate the shaft and due to the screw connection between this shaft and the wall of the chest through which it passes the shaft will be caused to move axially at the same time that it is rotated.

This regulating mechanism may also be employed for regulating the admission of air to the rotor 21 in accordance with the air admitted to the nozzle 4 and also regulate the axial movement of the stem 35 and the position of the needle in the nozzle 4.

As shown the shaft 40f carries a gear 40h which is moved by the shaft in a direction axially thereof as well as being rotated thereby. This gear 40h has toothed connection with a relatively wide gear 40i which is coupled with a suitable rotary type valve 40k which regulates the admission of air to the rotor 21.

There is also connected with the shaft 40f the previously referred to belt 37 which is connected with the pulley 37' carried upon the tubular stem 35. The rear end of this tubular stem 35 is supported in a bearing unit 44 with which is connected the pipe line 45 which may be connected with a suitable source of supply of any gases which it may be found desirable to introduce with the ore, such as oxidizing or chlorinating gases.

The bearing 44 is in a form to transmit the gases from the pipe 45 to the interior of the tubular stem 35 through suitable inlets 35' which are formed in the portion of the stem lying within the body of the bearing as is clearly illustrated in Figure 6.

It will be readily obvious from the foregoing that since the tubular stem 35 may readily move axially through the tubular shaft 27, the rotor 21 and the bearing 44, and since it is in threaded connection with a fixed nut 36, rotary movement imparted through the medium of the belt 37 from the shaft 40f will effect the desired axial movement of the stem to move the needle 34 inwardly or outwardly with respect to the nozzle 4. Also since the shaft 40f moves axially simultaneously with the axial movement of the stem 35 the driving belt connecting the shaft 40f and stem 35 will maintain the proper connection between these elements. The desired rotation of the air controlled valve 40k through the medium of the coupled gears 40h and 40i is readily effected even though the gear 40h moves axially, due to the extreme width of the gear 40i.

At the opposite end of the furnace there is a discharge section 8b, into which projects a refractory blast pipe 9 extending approximately to the base of the two cones of the double-conical revolving furnace 8. This blast pipe has compressed fresh air supplied to the same by the fan or blower unit 14 through pipe 14a. Another fan 10 is connected, by means of pipe 6, centrally to a chamber 7, into which the discharge section 8b of the rotating furnace 8 projects and out of which the fan 10 sucks the sulphurous acid-gas formed during the roasting action, and a part of the furnace gas laden with particles of ore which are returned and injected through the pipe 9 into the flame corona (funnel) to be again subjected to the hottest region of the spontaneous preliminary treatment in the long whirling flame. At 7a lumps, cakes and coarser particles can be discharged into trucks, the material in the discharge funnel of chamber 7 always forming an airtight and gastight seal. The recycling of the ore particles withdrawn by means of fan 10 is performed by a special apparatus, comprising a pipe 11 and an oval shaped chamber 12 (Fig. 5) provided with filter curtains 14d which cause the coarser particles to settle above the bottom where a conveyor 14b moves them into a series of discharge pipes 14c projecting into the above mentioned blast pipe 14a. The air blast therein set up by the blower 14 returns the discharged coarse and fine ore particles into pipe 9 as described. The revolving movement of the conveyor screw 14b is derived from the shaft of the fan 10 over a belting 8h and speed lowering gear 8k. The chamber 12 precedes a filtering tower 16 which may be of any approved construction and is provided at its lower end with a centrifugal device or a fine bronze jacket screen 13 through which the fan 10 forces the current of sulphurous acid-gas and air through bag filters 15. The bronze screen retains the coarser material and accumulates it in the lower funnel portion of the tower 16 along with the dust falling from the bags, which bags can be subjected to a mechanical shaking operation to assist the separation of the dust.

The filtered gas can be removed by any suitable means for treatment in a sulphuric acid plant not shown. The tower 16, in which the filter bags 15 are suspended, possesses above the bags a comparatively large empty space which during the operation is filled with the combustion gases, which are lighter than sulphur trioxide, so that nitrogen, carbon monoxide or carbon dioxide are able to escape into the air through a pipe 17. This arrangement within the tower 16 permits of a preliminary separation of the flue gases, as carbon monoxide with a specific weight of 0.967, nitrogen with a specific weight of 0.971 and carbon dioxide with a specific weight of 1.525 will always be displaced upwards in relation to sulphur dioxide and sulphur trioxide having specific weights of 2.214 and 2.765 respectively.

It is shown in Fig. 1 that the chamber 8 rotates upon rollers 8c (Fig. 2). The movement is derived from a motor 8d over gearing 8e. This motor also actuates, over a shaft 8f and a belting 8g, the fan 10.

My invention as employed for carrying out the chemical-thermal treatment for desulphurization purposes may also be used for performing other chemical thermal conversion processes, within the bound of protection secured by the following claims.

What I claim as new and desire to secure by Letters Patent:

1. An apparatus for the continual metallurgical treatment of raw ore materials in a flame chamber, a burner having an opening communicating with one end of the chamber including a constricted throat, means to regulate said burner including a movable core member extending through the burner opening, a conveyor for fuel and raw material to be treated opening into the burner throat, means for discharging combustion air into the burner throat adjacent to the conveyor, means for sucking from the chamber the gases and particles of material floating therein at the end thereof opposite from said burner, and a discharging device at the said opposite end thereof for separating the coarser pieces of material from the material floating on the gases within the chamber.

2. In an apparatus as claimed in claim 1, a refractory pipe opening out into the said opposite end of the chamber toward said burner for injecting a blast of fresh air into the chamber in opposition to a flame issuing therefrom, and means for producing said blast.

3. An apparatus for the continual metallurgical treatment of raw ore materials in a flame chamber, comprising, an elongated roasting chamber, a burner structure positioned at one end of the roasting chamber, and having an opening communicating with the end of the chamber, said burner structure including conveyor means positioned to supply raw material to be treated to said chamber through the burner opening and a plurality of air supply means positioned to discharge combustion air adjacent the burner opening to produce a whirling flame, and also to assist in projecting the material to be treated upon the flame into the chamber, and means for introducing into the chamber a counterblast of air from the centre of the opposite end of said chamber.

4. An apparatus for the continual metallurgical treatment of raw ore materials in a flame chamber, comprising, an elongated roasting chamber, a burner structure positioned at one end of the roasting chamber and having an opening communicating with the end of the chamber, said burner structure including conveyor means positioned to supply raw material to be treated to said chamber through the burner opening and a plurality of air supply means positioned to discharge combustion air adjacent the burner opening to produce a whirling flame, and also to assist in projecting the material to be treated upon the flame into the chamber, means for producing into the chamber a counterblast of air from the centre of the opposite end of said chamber.

5. An apparatus for the continual metallurgical treatment of raw ore materials in a flame chamber, comprising, an elongated roasting chamber, a burner structure positioned at one end of the roasting chamber and having an opening communicating with the end of the chamber, said burner structure including conveyor means positioned to supply raw material to be treated to said chamber through the burner opening and a plurality of air supply means positioned to discharge combustion air adjacent the burner opening to produce a whirling flame and also to assist in projecting the material to be treated upon the flame into the chamber, means for introducing into the chamber a counterblast of air from the centre of the opposite end of said chamber, means for revolving said elongated roasting chamber about its longitudinal axis, said roasting chamber being so positioned as to discharge therefrom coarser material collecting in the bottom position thereof, said discharge preferably disposed at the end for the introduction of the counterblast.

6. An apparatus for the continual metallurgical treatment of raw ore materials in a flame chamber, comprising, an elongated roasting chamber, a burner structure positioned at one end of the roasting chamber and having an opening communicating with the end of the chamber, said burner structure including conveyor means positioned to supply raw material to be treated to said chamber through the burner opening and a plurality of air supply means positioned to discharge combustion air adjacent the burner opening to produce a whirling flame, and also to assist in projecting the material to be treated upon the flame into the chamber, and means for introducing into the chamber a counterblast of air from the centre of the opposite end of said chamber and means for revolving said elongated roasting chamber about its longitudinal axis, said roasting chamber being so positioned as to discharge therefrom coarser material collecting in the bottom position thereof, said discharge preferably disposed at the end for the introduction of the counterblast.

7. An apparatus for the continual metallurgical treatment of raw materials in a flame chamber, comprising, an elongated roasting chamber, a burner structure positioned at one end of the roasting chamber and having an opening communicating with the end of the chamber, said burner structure including conveyor means positioned to supply raw particles of ore material to be treated to said chamber through the burner opening and a plurality of air supply means positioned to discharge combustion air adjacent the burner opening to produce a whirling flame and also to assist in projecting the particles of ore material to be treated upon the flame into the chamber, means for producing into the chamber a counterblast of air from the centre of the opposite end of the chamber, means for withdrawing from the roasting chamber a part of the roasting gases and particles of ore floating therein, and means for recycling the withdrawn gas and particles into the chamber in conjunction with the counterblast of air.

8. An apparatus for the continual metallurgical treatment of raw materials in a flame chamber, comprising a burner structure positioned at one end of the flame chamber and having an opening communicating with the end of the chamber, said burner structure including conveyor means positioned to supply raw material to be treated to said chamber through the burner opening and a plurality of air supply means positioned to discharge combustion air adjacent the burner opening to produce a whirling flame and also to assist in projecting the material to be treated upon the flame into the chamber, means for introducing into the chamber a counterblast of air from the centre of the opposite end of said chamber, means for withdrawing from the roasting chamber a part of the roasting gases and particles of ore floating therein, and means for recycling the withdrawn gas and particles into the flame in conjunction with the counterblast of air.

9. An apparatus for the continual metallurgical treatment of raw ore materials in a flame chamber, comprising, an elongated roasting chamber, a burner structure positioned at one end of the roasting chamber and having an opening communicating with the end of the chamber, said burner structure including conveyor means positioned to supply raw material to be treated to said chamber through the burner opening and a plurality of air supply means positioned to discharge combustion air adjacent the burner opening to produce a whirling flame and also to assist in projecting the material to be treated upon the flame into the chamber, means for introducing into the chamber a counterblast of air from the centre of the opposite end of the chamber, means for revolving said elongated roasting chamber about its longitudinal axis, said roasting chamber being so positioned as to discharge therefrom coarser material collecting in the bottom position thereof, said discharge preferably disposed at the end for the introduction of the counterblast, means for withdrawing from the roasting chamber a part of the roasting gases and particles of ore floating therein, and means for recycling the withdrawn gas and particles into the flame in conjunction with the counterblast of air.

10. An apparatus for the continual metallurgical treatment of raw ore materials in a flame chamber, comprising, an elongated roasting chamber, a burner structure positioned at one end of the roasting chamber and having an opening communicating with the end of the chamber, said burner structure including conveyor means positioned to supply raw material to be treated to said chamber through the burner opening and a plurality of air supply means positioned to discharge combustion air adjacent the burner opening to produce a whirling flame, and also to assist in projecting the material to be treated upon the flame into the chamber, means for introducing into the chamber a counterblast of air from the centre of the opposite end of said chamber, said elongated roasting chamber having an extended internal circumference at the region where the flame is produced.

11. An apparatus for the continual metallurgical treatment of raw materials in a flame chamber, comprising, an elongated roasting chamber, a burner structure positioned at one end of the roasting chamber and having an opening communicating with the end of the chamber, said burner structure including conveyor means positioned to supply raw particles of ore material to be treated to said chamber through the burner opening and a plurality of air supply means positioned to discharge combustion air adjacent the burner opening to produce a whirling flame, and also to assist in projecting the particles of ore material to be treated upon the flame into the chamber, means for introducing into the chamber a counterblast of air from the centre of the opposite end of the chamber, means for withdrawing from the roasting chamber a part of the roasting gases and particles of ore floating therein, and means for recycling the withdrawn gas and particles into the chamber in conjunction with the counterblast of air, said elongated flame chamber gradually increasing in diameter up to a region where the flame is distended into a hollow cone by action of the counterblast.

JULIUS LOHSE.